(12) United States Patent
He

(10) Patent No.: US 10,716,997 B2
(45) Date of Patent: *Jul. 21, 2020

(54) INFORMATION PROCESSING METHOD AND APPARATUS, ELECTRONIC DEVICE, AND STORAGE MEDIUM

(71) Applicant: NETEASE (HANGZHOU) NETWORK CO., LTD, Zhejiang (CN)

(72) Inventor: Zhaoda He, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/106,043

(22) Filed: Aug. 21, 2018

(65) Prior Publication Data
US 2019/0070494 A1 Mar. 7, 2019

(30) Foreign Application Priority Data

Sep. 1, 2017 (CN) .......................... 2017 1 0780043

(51) Int. Cl.
*A63F 13/00* (2014.01)
*A63F 13/2145* (2014.01)
(Continued)

(52) U.S. Cl.
CPC ........ *A63F 13/2145* (2014.09); *A63F 13/426* (2014.09); *A63F 13/533* (2014.09);
(Continued)

(58) Field of Classification Search
None
See application file for complete search history.

(56) References Cited

U.S. PATENT DOCUMENTS

2007/0238529 A1* 10/2007 Iwamoto ................ H04W 4/60
463/42
2011/0256912 A1* 10/2011 Baynes ................ A63F 13/803
463/6

(Continued)

FOREIGN PATENT DOCUMENTS

| CN | 105094345 A | 11/2015 |
| CN | 105597310 A | 5/2016 |
| CN | 106843651 A | 6/2017 |

OTHER PUBLICATIONS

"Introduction to the battle of freedom map" one writer in Cow game network : Kai Kai , Apr. 2, 2015, pp. 1-8, http://m.newyx.net/gl/349565.html.

(Continued)

*Primary Examiner* — Paul A D'Agostino
(74) *Attorney, Agent, or Firm* — Gang Yu

(57) ABSTRACT

An information processing method and apparatus, an electronic device, and a storage medium are provided. The method includes: a first touch area is provided on a graphical user interface, and a virtual character is configured to move in a game scene according to a first touch operation received by the first touch area; when detecting a second touch operation of which a starting touch point is in at least one signal icon, a mini-map in the graphical user interface is zoomed in, and a third touch operation of which a starting touch point is in the mini-map is detected; and when the end of the third touch operation is detected, and a position of an ending touch point of the third touch operation is in the mini-map, sending a prompt signal corresponding to at least one signal icon, the prompt signal including position indication information of the game scene.

18 Claims, 2 Drawing Sheets

(51) Int. Cl.
*G06F 3/0488* (2013.01)
*A63F 13/426* (2014.01)
*G06F 3/0484* (2013.01)
*H04M 1/00* (2006.01)
*A63F 13/533* (2014.01)
*A63F 13/5372* (2014.01)
*A63F 13/5378* (2014.01)
*H04L 29/06* (2006.01)

(52) U.S. Cl.
CPC ...... *A63F 13/5372* (2014.09); *A63F 13/5378* (2014.09); *G06F 3/04847* (2013.01); *G06F 3/04883* (2013.01); *H04M 1/00* (2013.01); *A63F 2300/1075* (2013.01); *A63F 2300/305* (2013.01); *A63F 2300/306* (2013.01); *G06F 2203/04806* (2013.01); *H04L 67/38* (2013.01)

(56) References Cited

U.S. PATENT DOCUMENTS

| | | | |
|---|---|---|---|
| 2013/0127980 A1* | 5/2013 | Haddick | G06F 3/013 348/14.08 |
| 2014/0089862 A1 | 5/2014 | Jones et al. | |
| 2014/0191977 A1* | 7/2014 | Feng | G06F 3/018 345/173 |
| 2014/0243089 A1* | 8/2014 | Tsukioka | A63F 13/12 463/31 |
| 2014/0245367 A1* | 8/2014 | Sasaki | H04N 21/4402 725/109 |
| 2016/0059131 A1* | 3/2016 | Ye | A63F 13/537 463/31 |

OTHER PUBLICATIONS

Search report of CN Priority application No. 201710780043.X, report dated Jul. 2, 2018.

* cited by examiner

INFORMATION PROCESSING METHOD AND APPARATUS, ELECTRONIC DEVICE, AND STORAGE MEDIUM

The present disclosure claims priority of Chinese Patent Application No. 201710780043.X, filed on Sep. 1, 2017 and named after "Information Processing Method and Apparatus, Electronic Device, and Storage Medium". Contents of the present disclosure are hereby incorporated by reference in entirety of the Chinese Patent Application.

TECHNICAL FIELD

The present disclosure relates to the technical field of games, and in particular to an information processing method and apparatus, an electronic device, and a storage medium.

BACKGROUND

With development of intelligent mobile terminals and game industry, a lot of mobile games with different themes emerge to meet requirements of players. Multiple players in groups for battle in games may be a core gameplay for many mobile games. For example, the core gameplay for Multi-player Online Battle Arena (MOBA) mobile games is 5V5 group battle, In a process of players in groups for battle in a game, communication and cooperation among the players are crucial. Therefore, whether a convenient and rapid interaction mechanism may be provided for communication among the players or not is an important influencing factor for player experiences in such a type of mobile games.

SUMMARY

At least one embodiment of the present disclosure provides an information processing method and apparatus, an electronic device, and a storage medium.

In one embodiment of the present disclosure, an information processing method is applied to a mobile terminal having at least one processor for executing a software application and a touch screen which is rendered with a graphical user interface. Contents presented on the graphical user interface include a game scene, a virtual character, a mini-map, and at least one signal icon. The method includes that: providing a first touch area on the graphical user interface, the virtual character is configured to move in the game scene according to a first touch operation received in the first touch area; when detecting a second touch operation of which a starting touch point is in the at least one signal icon, zooming in the mini-map on the graphical user interface, and detecting a third touch operation of which a starting touch point is in the mini-map; and when the end of the third touch operation is detected, and a position of an ending touch point of the third touch operation is in the mini-map, sending a prompt signal corresponding to the at least one signal icon, the prompt signal including position indication information of the game scene.

In another embodiment of the present disclosure, an information processing apparatus is applied to a mobile terminal having at least one processor for executing a software application and a touch screen which is rendered with a graphical user interface. Contents presented on the graphical user interface include a game scene, a virtual character, a mini-map, and at least one signal icon. The apparatus includes:

a movement control component, configured to provide a first touch area on a graphical user interface, and configure a virtual character to move in a game scene picture according to a first touch operation received in the first touch area; a first detection component, configured to zoom in, when detecting a second touch operation of which a starting touch point is in the at least one signal icon, a mini-map on the graphical user interface, and detect a third touch operation of which a starting touch point is in the mini-map; and a second detection component, configured to send, when the end of the third touch operation is detected, and a position of an ending touch point of the third touch operation is in the mini-map, a prompt signal corresponding to the at least one signal icon, the prompt signal including position indication information of the game scene.

In another embodiment of the present disclosure, an electronic device is provided. The electronic device includes: at least one processor; and at least one memory, configured to store at least one executable instruction of the at least one processor, and the at least one processor is configured to execute the information processing method by executing the at least one executable instruction.

In another embodiment of the present disclosure, a computer-readable storage medium is provided, on which at least one computer program is stored, and the at least one computer program is executed by at least one processor to implement the information processing method.

DETAILED DESCRIPTION

In order to make those skilled in the art better understand the solutions of the present disclosure, the technical solutions in the embodiments of the present disclosure will be described clearly and completely below with reference to the accompanying drawings in the embodiments of the present disclosure.

In the related art, a human-computer interaction designed for a player to send communication signal mainly includes one of the following manners.

In a first manner, the communication signal is sent in a text input manner. Since text input would interrupt an operation in a game, this manner is suitable for a player in a non-battle state.

In a second manner, a specific control is provided for player to send communication signals. For example, a gather signal sending button is provided for players to signal for a gather to allies. However, the player cannot autonomously select a position where the signal is located, so that it is impossible for the player to notify an exact gather place to the other allies.

In a third manner, through detecting a click operation of a player in a mini-map on a game interface to trigger a preset signal, then a communication signal will be sent in a position of a game scene, wherein the position of the game scene is corresponding to a position in the mini-map. In such a manner, the player can autonomously select a position where the signal located in, but the player cannot select a type (such as, gather, attack and retreat) of the prompt signal, and the type of the prompt signal may be automatically selected according to an algorithm by a system, so that a selection result is likely to be inconsistent with a real intention of the player. In addition, a screen space of a mobile phone is relatively small, so that a position cannot be accurately selected from the mini-map in the game, and a mis-operation rate is high. If the mini-map is zoomed in to improve operation accuracy, a screen display area will also be occupied, and the timely capture of battle information and game control of players are affected. For example, the zoomed-in mini-map will affect operations of the player on a virtual joystick.

In an embodiment of the present disclosure, an embodiment of an information processing method is provided. It should be noted that the steps shown in the flowchart of the drawings may be performed in a computer system such as a set of computer-executable instructions, and although a logical order is shown in the flowchart, in some cases, the illustrated or described steps may be performed in an order other than the above.

Figure 1:
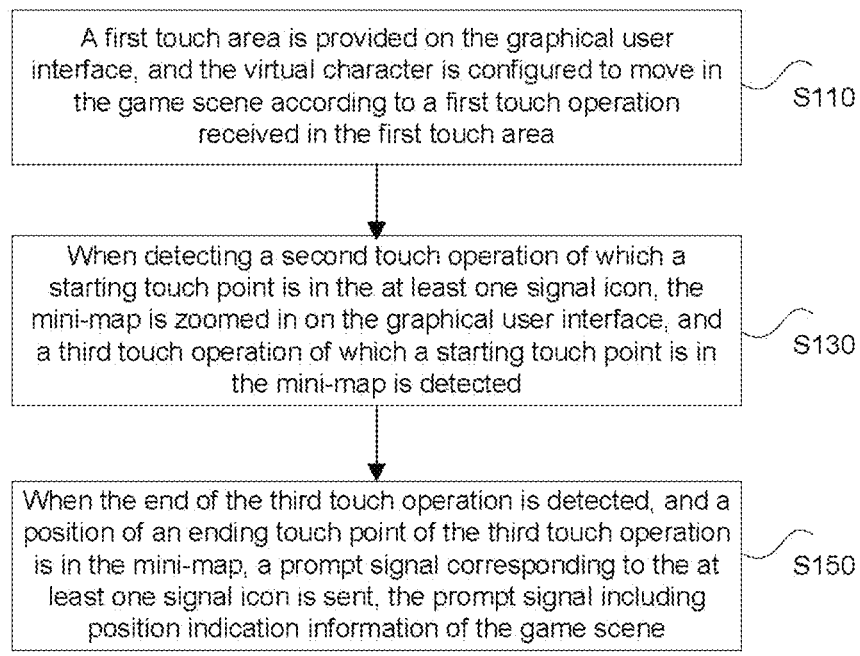
FIG. 1 is a flowchart of an information processing method according to an embodiment of the present disclosure.

FIG. 1 is a flowchart of an information processing method according to an embodiment of the present disclosure. The information processing method is applied to a mobile terminal having at least one processor for executing a software application and a touch screen which is rendered with a graphical user interface. Contents presented on the graphical user interface include a game scene, a virtual character, a mini-map, and at least one signal icon. As shown in FIG. 1, the method may include the steps as follows.

At step S110, a first touch area is provided on the graphical user interface, and the virtual character is configured to move in the game scene according to a first touch operation received in the first touch area.

At step S130, when detecting a second touch operation of which a starting touch point is in the at least one signal icon, the mini-map is zoomed in on the graphical user interface, and a third touch operation of which a starting touch point is in the mini-map is detected.

At step S150, when the end of the third touch operation is detected, and a position of an ending touch point of the third touch operation is in the mini-map, a prompt signal corresponding to the at least one signal icon is sent, the prompt signal including position indication information of the game scene.

With the information processing method in the present exemplary embodiment, on the one hand, position information could be sent without manually inputting a related position information by a player; on the other hand, it is not necessary for the player to click a zoom-in button of a mini-map to zoom in the mini-map, and the player can clicks a signal icon by the right hand instead, then, at least one of a position and object can be selected in the mini-map by the left hand. The operations would be more coherent and simple, and a type of a signal can be selected. The information processing method in the present exemplary embodiment solves technical problems that a position cannot be conveniently specified and operations are incoherent and inconvenient in sending prompt signal in a mobile game.

In the following, the steps of the information processing method in the present exemplary embodiment will be further described.

In the present exemplary embodiment, the information processing method is provided by executing a software application on a processor of a mobile terminal and performing rendering a graphical user interface on a touch display screen of the mobile terminal. Contents presented by the graphical user interface include a game scene, a virtual character, a mini-map, and at least one signal icon.

Figure 2:
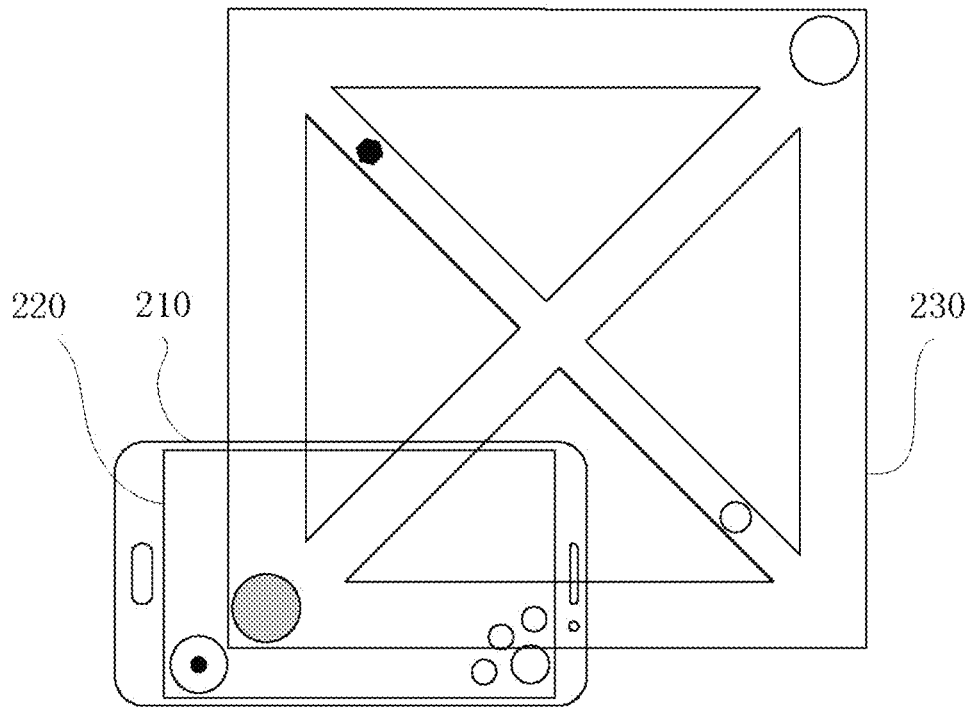
FIG. 2 is a schematic diagram of a game scene according to an embodiment of the present disclosure.

Contents presented on the graphical user interface may include an entire part of the game scene, and may also include a part of the game scene. For example, as shown in FIG. 2, since a game scene 230 is relatively large, local content of the game scene 230 is displayed on a graphical user interface 220 of a mobile terminal 210 during a process of playing the game.

The mini-map may be a thumbnail of the entire game scene (e.g., 310 in FIG. 3), or may be a thumbnail of a local part of the game scene. Different details may be displayed in the mini-map for different types of games (e.g., details of maps that can be used for assisting players in determining their positions in a game world, real-time positions of ally characters, real-time positions of enemy characters, vision information of a current game scene, etc.). The mini-map may be displayed at the upper left, upper right, or other positions of the graphical user interface. The present exemplary embodiment is not limited to the position for displaying the mini-map.

Figure 3:
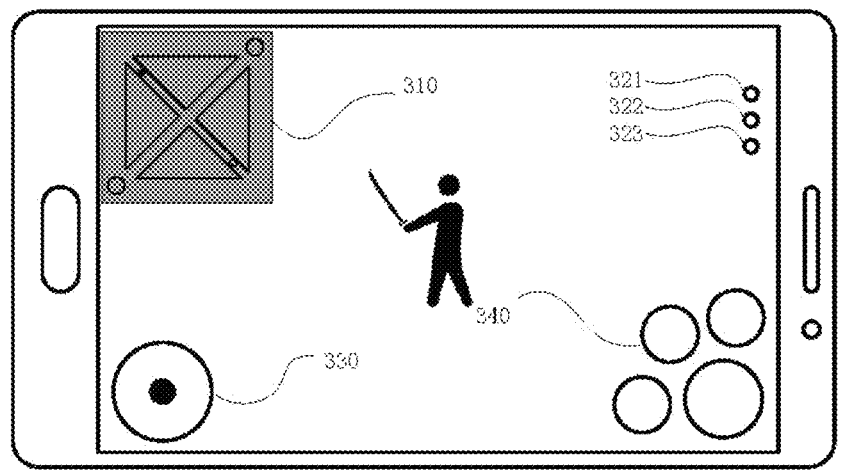
FIG. 3 is a schematic diagram of a graphical user interface of a mobile terminal according to an embodiment of the present disclosure.

The graphical user interface includes at least one signal icon (e.g., signal icons 321, 322, 323 in FIG. 3). The at least one signal icon may be located at the upper left, upper right, or other positions of the graphical interface. The at least one signal icon may also be located on the same or different sides of the graphical user interface. The present exemplary embodiment is not limited to the position for displaying the at least one signal icon.

At step S110, a first touch area is provided on the graphical user interface, the virtual character is configured to move in the game scene according to a first touch operation received in the first touch area.

A first touch area is provided on the graphical user interface, and the virtual character is configured to move in the game scene according to a first touch operation received in the first touch area.

The first touch area may be a visible area on the graphical user interface, or may also be an invisible area. An operation area such as a virtual joystick or a direction control virtual button may be displayed in the first touch area. The present exemplary embodiment is not limited to displayed contents of the first touch area.

In an optional embodiment, the first touch area may be a visible area on the graphical user interface, such as a touch area having a boundary frame, or a touch area rendered with at least one color or predetermined transparency, or adopts other modes to distinguish the touch area visually. The virtual character is controlled to perform at least one of movement and turning around in the game scene according to a touch operation such as sliding and clicking received in the first touch area. A visual area can be positioned quickly by players, and an operation difficulty for a game novice would be reduced.

In an optional embodiment, the first touch area may be set as an invisible area on the graphical user interface. Thus, the first touch area would not cover or affect a game screen, and it can save the screen space and provide a better view for players. However, since the first touch area is invisible and it is hard to be sensed by a player, as an optional implementation solution, a visual guide control may be displayed in the first touch area. For example, when a virtual joystick is used as a direction control solution of a virtual character, the virtual joystick may be displayed in the first touch area to visually guide the player.

In an optional embodiment, the first touch area is a virtual cross button area or a virtual D-PAD area. The virtual character is controlled to perform at least one of movement and turning around in the game scene according to a first touch operation received in the virtual cross button area.

In an optional embodiment, the first touch area is a virtual joystick control area. The virtual character is controlled to perform at least one of movement and turning around in the game scene according to a first touch operation received in the virtual joystick area.

For example, as shown in FIG. 3, the first touch area is a virtual joystick control area. The virtual joystick control area is located at the lower left of the graphical user interface, and a virtual joystick 330 is displayed in the area. The virtual character is controlled to move in the game scene according to a first touch operation received in the virtual joystick control area. Multiple skill icons 340 are provided at the lower right of the graphical user interface for providing the player with control functions of casting skills. Therefore, in an optional embodiment, the virtual character may be controlled to move in the game scene by the left hand of the player, and controlled to cast skills by the right hand. The skills indicated by the skill icons 340 may be attack skills (e.g., skills that is capable of reducing Health Points (HP) value of at least one virtual enemy character), restoring health skills (e.g., skills that is capable of restoring HP value of at least one virtual ally character), and freezing skills (e.g., skills that is capable of stopping or slowing down actions of at least one virtual enemy character). In addition, skills corresponding to the skill icons 340 may be targeting skills, or non-targeting skills(namely click to cast). After a touch operation in one of the skill icons 340 is detected, a virtual joystick for controlling a skill position or direction may be generated at the center of the touched skill icon 340, or at the position of a start touch point of the touch operation executed by the player. The player may control the virtual joystick by sliding to set the skill position or direction, and cast the skill when the player finishes the touch operation.

At step S130, when detecting a second touch operation of which a starting touch point is in the at least one signal icon, the mini-map is zoomed in on the graphical user interface, and a third touch operation of which a starting touch point is in the mini-map is detected.

In the present embodiment, when detecting a second touch operation of which a starting touch point is in the at least one signal icon, the mini-map is zoomed in on the graphical user interface, and a third touch operation of which a starting touch point is in the mini-map is detected.

For example, when detecting a sliding touch operation in the signal icon by one finger of a player, the mini-map is zoomed in on the graphical user interface and a third touch operation of which a starting touch point is in the mini-map is detected. Or, when detecting a clicking touch operation in the signal icon by one finger of a player, the mini-map is zoomed in on the graphical user interface and a third touch operation of which a starting touch point is in the mini-map is detected.

In an optional embodiment, when detecting a second touch operation of which a touch point passes through the at least one signal icon, the mini-map is zoomed in on the graphical user interface, and a third touch operation of which a starting touch point is in the mini-map is detected. That is, the starting point of the second touch operation is not located in the at least one signal icon, the starting touch point may be outside of the at least one signal icon, and the touch point is located in the signal icon during a process the second touch operation.

In an optional embodiment, when detecting a second touch operation of which a starting touch point is in the at least one signal icon, the mini-map is zoomed in on the graphical user interface, and a third touch operation of which a touch point pass through the mini-map is detected. That is, the starting point of the third touch operation is not located in the mini-map, the starting touch point may be outside of the mini-map, and the touch point is located in the mini-map during a process of the third touch operation.

In an optional embodiment, it may also be determined that whether a position of a current touch point of the second touch operation satisfies a preset condition, if yes, the mini-map is zoomed in. Accordingly, it is avoided that such operation of zooming in the mini-map is not in accordance with an intention of the player. The preset condition may include one of the followings: the position of the current touch point is in an activation response area; the distance between the position of the current touch point and the position of the mini-map is shorter than or equal to a preset distance; the distance between the position of the current touch point and the position of the at least one signal icon is longer than a preset distance; other preset conditions.

In the present embodiment, the preset condition includes: the position of the current touch point is in an activation response area. That is, when detecting the position of the current touch point is in an activation response area , the mini-map is zoomed in.

Figure 4:
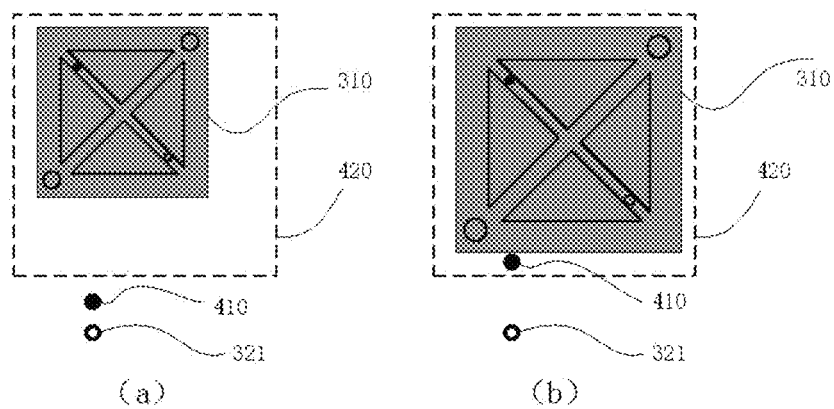
FIG. 4 is a schematic diagram of zooming in a mini-map according to an embodiment of the present disclosure.

For example, as shown in FIG. 4(a), an activation response area 420 is provided on the graphical user interface, and the mini-map 310 is located in the activation response area 420. The activation response area 420 may be visible or invisible. In an optional embodiment, the activation response area 420 is invisible, so that the screen space can be fully utilized without occlusion. When detecting a touch operation of which a starting touch point is in a signal icon 321, the position of the current touch point 410 of the touch operation is detected in real time. As shown in FIG. 4(b), when detecting the position of the current touch point 410 is in the activation response area 420, the mini-map 310 is zoomed in to a preset size.

It should be noted that a contour shape and size of the activation response area 420 and a relationship between the activation response area 420 and the mini-map 310 are not limited to the situation in the present embodiment, and may also be other situations. The shape of the activation response area 420 may be square, circular, or any other shape (including irregular polygons). The activation response area 420 may coincide with the mini-map 310. That is, when the current touch point 410 moves in the mini-map 310, the mini-map 310 is zoomed in. The position of the activation response area 420 does not necessarily cover the entire of the mini-map 310, may also partially cover the mini-maps 310, or may not cover the mini-maps 310.

In an optional embodiment, the preset condition includes: the distance between the position of the current touch point and the position of the mini-map is shorter than or equal to a preset distance. That is, when detecting the distance between the position of the current touch point and the position of the mini-map is shorter than or equal to a preset distance, the mini-map is zoomed in.

For example, the distance between the position of the current touch point and a position of a preset point (e.g., a central point) in the mini-map is detected. When detecting the distance between the position of the current touch point and the position of the preset point in the mini-map is shorter than or equal to a preset distance, the mini-map is zoomed in.

In an optional embodiment, a distance between the current touch point 410 of the second touch operation and the signal icon 321 may also be adopted as a preset condition for controlling the mini-map to be zoomed in. For example, when the distance between the position of the current touch point 410 and the position of the signal icon 321 is longer than a preset value, the mini-map 310 is zoomed in.

At step S150, when the end of the third touch operation is detected, and a position of an ending touch point of the third touch operation is in the mini-map, a prompt signal corresponding to the at least one signal icon is sent, the prompt signal including position indication information of the game scene.

For example, a current touch point of a third touch operation (e.g., a sliding touch operation or a clicking touch operation) is located in a mini-map. If a touch medium (e.g., at least one finger or a touch pencil) leaves a touch screen at this time, the current touch point is the ending touch point of the third touch operation. In this way, the position of the ending touch point of the third touch operation is detected in the mini-map, and a prompt signal corresponding to the signal icon is sent (e.g., attack, retreat, etc.), the prompt signal including position indication information of the game scene.

The function of the prompt signal is used for prompting other players in the game (e.g., allies in a team game). Therefore, the prompt signal may be sent to allies through a game server, so that a corresponding signal is displayed on the game graphical user interface of allies' devices. Of course, corresponding signals may also be displayed on the game graphical user interfaces of all allies' or all players' devices.

Figure 5:
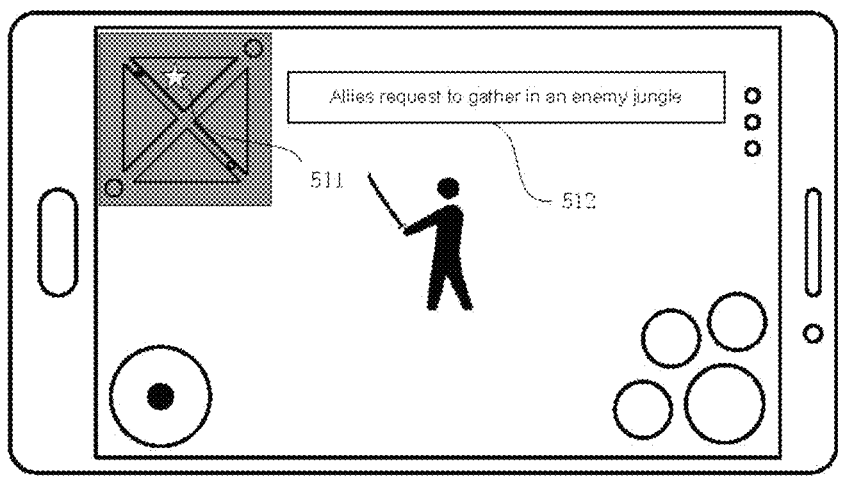
FIG. 5 is a schematic diagram of displaying a prompt signal according to an embodiment of the present disclosure.

In an optional embodiment, after sending the prompt signal, the position of a game scene indicated by the position indication information of the game scene is identified in the mini-map, as position 511 shown in FIG. 5.

In an optional embodiment, when a prompt signal sent by other terminals is received, a position of a game scene indicated by the position indication information of the game scene is identified in the mini-map, as position 511 shown in FIG. 5.

One of the technical problems to be solved by the present disclosure is to provide an interaction mechanism that the player can send position information without manually inputting the position information. Therefore, in at least one embodiment of the present disclosure, the prompt signal includes position indication information of the game scene. On the one hand, it is able to send position information but does not require the player to manually input the position; on the other hand, there is no need for the player to click a zoom-in button of the mini-map by the left hand, and the player can click a signal icon to zoom in the mini-map by the right hand. So that at least one of a position and object can be selected by the left hand in the mini-map. The operation is more coherent and simple, and a type of a signal can be selected. In an optional embodiment, a terminal of the player receives the prompt signal and identifies the position in the mini-map according to the position indication information, so that the player can intuitively know the position indicated by the prompt signal on a panoramic thumbnail of the game scene. The prompt signal may be shown as a dynamic effect such as a flashing highlighting prompt. In an optional embodiment, after the terminal sends the prompt signal, the position indicated by the prompt signal may also be identified in the mini-map, so that the player would obtain a good operation feedback.

In addition to the position indication information, the prompt signal may also include voice prompt information, text prompt information, or a reminding voice, a reminding text (e.g., 512 in FIG. 5), and the like. For example, a reminding voice may be sent to terminals of other players (e.g., when a player selects "gather", audio information "gather" of voice reminding is sent to the terminals of other players), and voice reminding indication information may also be sent to the terminals of other players to indicate the terminals of other players to play the corresponding and pre-stored voice audio.

In an optional embodiment, when the end of the third touch operation is detected, and the position of the ending touch point of the third touch operation is outside of the mini-map, the prompt signal sending corresponding to the signal icon is cancelled.

For example, the player can perform a sliding touch operation in the mini-map. When the player wants to cancel to send the prompt signal, the player may slide the finger out of the mini-map.

In an optional embodiment, the position indication information of the game scene includes position information in the game scene corresponding to the position of the ending touch point of the touch operation.

For example, a position of an ending touch point of the third touch operation in mini-map is located at a point A. According to a corresponding relationship between the mini-map and a game scene, a position of the point B in the game scene may be determined. Position indication information of the game scene includes position indication information of the point B (it should be noted that the position indication information of the point B may be the coordinates of the point B in the game scene, or the coordinates of the point A corresponding to the point B in the mini-map, or other position indication information capable of directly or indirectly indicating the position of the point B). Or, a position of an ending touch point of a finger of a player in a mini-map is a point A. According to a corresponding relationship between the mini-map and a game scene, a position of the point B in the game scene may be determined, the point B is located in a specific area C (e.g., a jungle C) in the game scene, and the position indication information of the game scene includes the position indication information of the specific area C.

In an optional embodiment, after sending the corresponding prompt signal, the mini-map is restored.

According to an embodiment of the present disclosure, an information processing apparatus is also provided by executing a software application on a processor of a mobile terminal and performing rendering a graphical user interface on a touch display screen of the mobile terminal. Contents presented by the graphical user interface include a game scene, a virtual character, a mini-map, and at least one signal icon. The apparatus includes:

a movement control component, configured to provide a first touch area on a graphical user interface, and configure a virtual character to move in a game scene picture according to a first touch operation received by the first touch area;

a first detection component, configured to zoom in, when detecting a second touch operation of which a starting touch point is in the at least one signal icon, a mini-map in the graphical user interface, and detect a third touch operation of which a starting touch point is in the mini-map; and a second detection component, configured to send, when detecting a position of an ending touch point of the third touch operation is in the mini-map, a prompt signal corresponding to the at least one signal icon, the prompt signal comprising position indication information of the game scene.

According to an embodiment of the present disclosure, an electronic device is also provided. The electronic device includes: a processing component, which may further include at least one processor, and a memory resource represented by a memory and configured to store at least one instruction executable by the processing component, such as at least one application program. The at least one application program stored in the memory may include one or more components each corresponding to a set of instructions. In addition, the processing component is configured to execute instructions to perform the above-described information processing method.

The electronic device may also include: a power supply component, configured to perform power management on the executed electronic device; a wired or wireless network interface, configured to connect the electronic device to a network; and an input output (I/O) interface. The electronic device may operate based on an operating system stored in a memory, such as Android, iOS, Windows, Mac OS X, Unix, Linux, FreeBSD, or the like.

According to an embodiment of the present disclosure, a computer-readable storage medium is also provided. A program product capable of implementing the above method of the present specification is stored thereon. In some possible implementation manners, various aspects of the present disclosure may also be implemented in the form of a program product, which includes a program code for causing a terminal device to execute the steps according to various exemplary implementation manners of the present disclosure described in the "Exemplary Method" section of the present specification when the program product runs on a terminal device. It may use a portable Compact Disc Read-Only Memory (CD-ROM) and include a program code, and may run on a terminal device such as a personal computer. However, the program product of the present disclosure is not limited thereto, and in this document, the readable storage medium may be any tangible medium that contains or stores a program. The program may be used by or in conjunction with an instruction execution system, device, or apparatus.

The program product may employ any combination of at least one readable media. The readable medium may be a readable signal medium or a readable storage medium. The readable storage medium may be, for example but not limited to, an electrical, magnetic, optical, electromagnetic, infrared, or semiconductor system, apparatus, or device, or any combination of the above. More specific examples (non-exhaustive listings) of the readable storage medium include: electrical connectors with one or more wires, portable disks, hard disks, Random Access Memories (RAMs), ROMs, Erasable Programmable Read-Only Memories (EPROMs or flash memories), optical fibers, portable CD-ROMs, optical storage devices, magnetic storage devices, or any suitable combination of the above.

The sequence numbers of the foregoing embodiments of the present disclosure are merely for description and do not represent the advantages and disadvantages of the embodiments.

In the foregoing embodiments of the present disclosure, the description of each embodiment has its own emphasis. For the part not described in detail in one embodiment, reference may be made to the relevant description of other embodiments.

Apparently, the described embodiments are merely a part of the embodiments of the present disclosure, not all of the embodiments. On the basis of the embodiments of the present disclosure, all other embodiments obtained on the premise of no creative work of those skilled in the art fall within the protection scope of the present disclosure.

It should be noted that the specification and claims of the present disclosure and terms "first", "second", etc. in the foregoing drawings are used for distinguishing similar objects rather than describing a specific sequence or a precedence order. It will be appreciated that the terms used in such a way may be exchanged under appropriate conditions, in order that the embodiments of the present disclosure described here can be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or elements to clearly list those steps or elements, and other steps or elements which are not clearly listed or are inherent to these processes, methods, products or devices may be included instead.

In some embodiments provided by the present disclosure, it shall be understood that the disclosed technical content may be implemented in other modes. For example, the apparatus embodiment described above is schematic. For example, the division of the components or elements is the division of logical functions, and there may be additional division modes during practical implementation. For example, a plurality of elements or assemblies may be combined or integrated to another system, or some characteristics may be omitted or may be not executed; and in addition, displayed or discussed mutual coupling or direct coupling or communication connection may be performed via some interfaces, and indirect coupling or communication connection between apparatuses or elements may be in an electrical form, a mechanical form or other forms.

The elements illustrated as separate components may be or may not be physically separated. Components for element display may be or may not be physical elements. That is, the components may be located at a place or may be distributed on a plurality of network elements. The aims of the solutions of the embodiments may be achieved by selecting some or all elements according to actual requirements.

In addition, all function elements in all embodiments of the present disclosure may be integrated in a processing element, or each element may exist separately and physically, or two or more elements may be integrated in a element. The integrated element may be implemented in a hardware form or may be implemented in a software function element form.

If the integrated element is implemented in the form of a software function element and is sold or used as an independent product, the product may be stored in a computer-readable storage medium. Based on this understanding, the technical solutions of the present disclosure may be substantially embodied in the form of a software product or parts contributing to the traditional art or all or some of the technical solutions may be embodied in the form of a software product, and a computer software product is stored in a storage medium, including a plurality of instructions enabling a computer device (which may be a personal computer, a server or a network device) to execute all or some of the steps of the method according to each embodiment of the present disclosure.

The above are exemplary implementation manners of the present disclosure, and it should be pointed out that those of ordinary skill in the art can also make several improvements and modifications without departing from the principle of the present disclosure. These improvements and modifications should also be regarded as the scope of protection of the present disclosure.

What is claimed is:

1. An information processing method, applied to a mobile terminal having at least one processor for executing a software application and a touch screen which is rendered with a graphical user interface, contents presented on the graphical user interface comprising a game scene, a virtual character, a mini-map, and at least one signal icon, the method comprising:

providing a first touch area on the graphical user interface, the virtual character is configured to move in the game scene according to a first touch operation received in the first touch area;

when detecting a second touch operation of which a starting touch point is in the at least one signal icon, zooming in the mini-map on the graphical user interface, and detecting a third touch operation of which a starting touch point is in the mini-map; and when the end of the third touch operation is detected, and a position of an ending touch point of the third touch operation is in the mini-map, sending a prompt signal corresponding to the at least one signal icon, the prompt signal comprising position indication information of the game scene.

2. The information processing method as claimed in claim 1, further comprising:

after sending the prompt signal, identifying the position of the game scene indicated by a position indication information of the game scene in the mini-map.

3. The information processing method as claimed in claim 1, further comprising:

when the prompt signal sent by other terminals is received, identifying a position of the game scene indicated by the position indication information of the game scene in the mini-map.

4. The information processing method as claimed in claim 1, further comprising:

after sending the prompt signal, restoring the mini-map.

5. The information processing method as claimed in claim 1, wherein the prompt information further comprises at least one of voice prompt information and text prompt information.

6. The information processing method as claimed in claim 1, wherein the first touch area is a virtual joystick control area.

7. The information processing method as claimed in claim 1, wherein the position indication information of the game scene comprises position information in the game scene corresponding to the position of the ending touch point of the third touch operation.

8. An information processing apparatus, applied to a mobile terminal having at least one processor for executing a software application and a touch screen which is rendered with a graphical user interface, contents presented on the graphical user interface comprising a game scene, a virtual character, a mini-map, and at least one signal icon, the apparatus comprising:

a movement control component, configured to provide a first touch area on a graphical user interface, and configure a virtual character to move in a game scene picture according to a first touch operation received in the first touch area;

a first detection component, configured to zoom in, when detecting a second touch operation of which a starting touch point is in the at least one signal icon, a mini-map on the graphical user interface, and detect a third touch operation of which a starting touch point is in the mini-map; and a second detection component, configured to send, when the end of the third touch operation is detected, and a position of an ending touch point of the third touch operation is in the mini-map, a prompt signal corresponding to the at least one signal icon, the prompt signal comprising position indication information of the game scene.

9. A computer-readable storage medium, on which at least one computer program is stored, wherein the at least one computer program is executed by at least one processor to implement the information processing method as claimed in claim 1.

10. An electronic device, comprising:

at least one processor; and at least one memory, configured to store at least one executable instruction of the at least one processor, wherein the at least one processor is configured to execute the information processing method as claimed in claim 1 by executing the at least one executable instruction.

11. The information processing method as claimed in claim 1, wherein contents present on the graphical user interface comprises one of the following: an entire part of the game scene, and a local part of the game scene.

12. The method as claimed in claim 1, wherein the first touch area is a virtual button control area for controlling directions.

13. The method as claimed in claim 1, wherein the first touch area is a visible area on the graphical user interface.

14. The method as claimed in claim 1, wherein the first touch area is an invisible area on the graphical user interface.

15. The method as claimed in claim 14, displaying a visual guide control in the first touch area.

16. The method as claimed in claim 1, wherein before zooming in the mini-map in the graphical user interface, the method further comprises:

determining whether a position of a current touch point of the second touch operation satisfies a preset condition.

17. The method as claimed in claim 16, wherein the preset condition comprises one of the following:

the position of the current touch point is in an activation response area;

a distance between the position of the current touch point and the mini-map is shorter than or equal to a preset distance; and a distance between the position of the current touch point and the at least on e signal icon is longer than a preset distance.

18. The method as claimed in claim 1, further comprising:

when the end of the third touch operation is detected, and the position of the ending touch point of the third touch operation is outside of the mini-map, canceling to send the prompt signal.

* * * * *